US010133878B2

(12) United States Patent
Horvitz et al.

(10) Patent No.: US 10,133,878 B2
(45) Date of Patent: Nov. 20, 2018

(54) STOCHASTIC PRIVACY

(71) Applicant: Microsoft Technology Licensing, LLC, Redmond, WA (US)

(72) Inventors: Eric J. Horvitz, Redmond, WA (US); Semiha Ece Kamar Eden, Redmond, WA (US); Ryen W. White, Redmond, WA (US); Adish Singla, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/447,563

(22) Filed: Jul. 30, 2014

(65) Prior Publication Data
US 2016/0034705 A1 Feb. 4, 2016

(51) Int. Cl.
G06F 21/62 (2013.01)
H04W 12/02 (2009.01)
G06Q 50/00 (2012.01)
H04L 29/08 (2006.01)

(52) U.S. Cl.
CPC ...... G06F 21/6245 (2013.01); G06F 21/6254 (2013.01); G06Q 50/00 (2013.01); H04W 12/02 (2013.01); H04L 67/22 (2013.01)

(58) Field of Classification Search
None
See application file for complete search history.

(56) References Cited

U.S. PATENT DOCUMENTS 8,301,493 B2 10/2012 Sanders et al.
8,346,749 B2 1/2013 Krause et al.
8,655,721 B2 2/2014 McAuliffe et al.
2008/0103900 A1* 5/2008 Flake ............... G06Q 30/02 705/14.41
2009/0271374 A1 10/2009 Korn et al.
2011/0003583 A1 1/2011 Krause et al.
(Continued)

FOREIGN PATENT DOCUMENTS

WO 2014049605 A1 4/2014

OTHER PUBLICATIONS

Shou, et al., "Supporting Privacy Protection in Personalized Web Search", In IEEE Transactions on Knowledge and Data Engineering, vol. 26, Issue 2, Feb. 2014, pp. 453-467.
(Continued)

Primary Examiner — Michael R Vaughan

(57) ABSTRACT

A stochastic privacy service provider may provide users with a guaranteed upper bound on a probability that personal data will be accessed while enabling the services to collect data that can be used to enhance its services. Users may receive incentives to become participants in a stochastic privacy program. The stochastic privacy provider may employ one or more probabilistic and decision-theoretic methods to determine which participants' personal data should be sought while guaranteeing that the probability of personal data being accessed is smaller than the mutually agreed upon probability of access. The probability of access may be on a per time basis. The stochastic privacy provider may access coalescenses of the personal data of sets of multiple people, where a maximum probability is given for accessing statistical summaries of personal data computed from groups of people that are of at least some guaranteed size.

13 Claims, 8 Drawing Sheets

(56) References Cited

U.S. PATENT DOCUMENTS

| | | | | |
|---|---|---|---|---|
| 2011/0173071 | A1* | 7/2011 | Meyer | G06Q 30/0256 705/14.54 |
| 2012/0150641 | A1* | 6/2012 | Dobbs | G06Q 30/02 705/14.53 |
| 2012/0259788 | A1* | 10/2012 | Alles | G06Q 20/10 705/310 |
| 2012/0311131 | A1 | 12/2012 | Arrasvuori | |
| 2013/0006748 | A1 | 1/2013 | Horvitz et al. | |
| 2013/0339142 | A1* | 12/2013 | Hewinson | G06Q 30/02 705/14.51 |
| 2015/0186934 | A1* | 7/2015 | Van Deventer | G06Q 30/0631 705/14.49 |

OTHER PUBLICATIONS

Lebanon, et al., "Beyond k-Anonymity: A Decision Theoretic Framework for Assessing Privacy Risk", In Proceedings of Transactions on Data Privacy, vol. 2, No. 3, Dec. 2009, pp. 153-183.
Massaguer, et al., "Middleware for Pervasive Spaces: Balancing Privacy and Utility", In Proceedings of 10th ACM/IFIP/USENIX International Conference on Middleware, Nov. 30, 2009, 20 pages.
Hann, et al., "Online Information Privacy: Measuring the Cost-Benefit Trade-off", In Proceedings of 23rd International Conference on Information Systems, Dec. 15, 2002, 10 pages.
Adar, Eytan, "User 4xxxxx9: Anonymizing Query Logs", In Workshop on Query Log Analysis at the 16th World Wide Web Conference, May 8, 2007, 8 pages.
Arrington, Michael, "Aol proudly releases massive amounts of private data", Published on: Aug. 6, 2006, Available at: http://techcrunch.com/2006/08/06/aol-proudly-releases-massive-amounts-of-user-search-data/.
Bennett, et al., "Inferring and Using Location Metadata to Personalize Web Search", In Proceedings of the 34th international ACM SIGIR conference on Research and development in Information Retrieval, Jul. 24, 2011, 10 pages.
Bennett, et al., "Classification-Enhanced Ranking", In Proceedings of the 19th international conference on World wide web, Apr. 26, 2010, 10 pages.
Cooper, Alissa, "A Survey of Query Log Privacy Enhancing Techniques from a Policy Perspective", In Journal of ACM Transactions on the Web, vol. 2 Issue 4, Oct. 2008, 27 pages.
Feige, Uriel, "A Threshold of In n for Approximating Set Cover", In Journal of the ACM, vol. 45 Issue 4, Jul. 1998, 19 pages.
Hassan, et al., "Personalized Models of Search Satisfaction", In Proceedings of the 22nd ACM international conference on Conference on information & knowledge management, Oct. 27, 2013, 10 pages.
Kaufman, et al., "Finding groups in data: an introduction to cluster analysis", In Book of Wiley Series in Probability and Statistics, May 27, 2008, 3 pages.
Krause, et al., "A Note on the Budgeted Maximization on Submodular Functions", In Technical Report CMU-CALD-05-103, Mar. 2005, 7 pages.
Krause, et al., "Near-Optimal Observation Selection using Submodular Functions", In Proceedings of the 22nd national conference on Artificial intelligence, vol. 2, Jul. 22, 2007, 5 pages.
Krause, et al., "A Utility-Theoretic Approach to Privacy and Personalization", In Proceedings of the 23rd national conference on Artificial intelligence, vol. 2, Jul. 13, 2008, 8 pages.
Krause, et al., "A Utility-Theoretic Approach to Privacy in Online Services", In Journal of Artificial Intelligence Research, vol. 39, Jan. 16, 2014, 30 pages.
Mirzasoleiman, et al., "Distributed Submodular Maximization: Identifying Representative Elements in Massive Data", In Proceedings of Neural Information Processing Systems, Dec. 6, 2013, 9 pages.
Narayanan, et al., "Robust de Anonymization of Large Sparse Datasets", In Proceedings of the IEEE Symposium on Security and Privacy, Feb. 5, 2008, 24 pages.
Nemhauser, et al., "An Analysis of the Approximations for Maximizing Submodular set Functions", In Mathematical Programming, vol. 14, Issue 1, Retrieved on: May 6, 2014, 30 pages.
Olson, et al., "A Study of Preferences for Sharing and Privacy", In Proceedings of CHI 05 Extended Abstracts on Human Factors in Computing Systems, Apr. 2, 2005, 5 pages.
Singla, et al., "Sampling High Quality Clicks from Noisy Click Data", In Proceedings of the 19th international conference on World wide web, Apr. 26, 2010, 2 pages.
Smith, Brad, "Privacy and technology in balance", Published on: Oct. 26, 2012, Available at: http://blogs.technet.com/b/rnicrosoft_on_the_issues/archive/2012/10/26/privacy-and-technology-in-balance.aspx.
White, et al., "Characterizing the Influence of Domain Expertise on Web Search Behavior", In Proceedings of the Second ACM International Conference on Web Search and Data Mining, Feb. 9, 2009, 10 pages.
"ComScore", Retrieved on: May 6, 2014, Available at: http://en.wikipedia.org/wiki/ComScore#Data_collection_and_reporting.
Xu, et al., "Privacy-Enhancing Personalized Web Search", In Proceedings of the 16th international conference on World Wide Web, May 8, 2007, 10 pages.

* cited by examiner

STOCHASTIC PRIVACY

BACKGROUND

Online service providers such as web search providers, recommendation engines, social networks, and e-commerce businesses may gather data about activities (e.g., click logs, search histories, and browsing histories) and personal information (e.g., location information, demographic/socio-economic information, etc.) of users. The availability of such data enables the service providers to personalize services to individual users and also to learn how to enhance services for all users (e.g., improved search results). User data is also important to the service providers for optimizing revenues via better targeted advertising, extended user engagement and popularity, and even the selling of user data to third party companies. Permissions for sharing the user data with third parties are typically obtained via broad consent agreements that request user permission to share their data through system dialogs or via complex Terms of Service.

SUMMARY

In some embodiments, a method of handling personal data includes: providing a personal data utilization probability guarantee, wherein a participant of a stochastic privacy program is guaranteed that personal data of the program participant will be utilized with a probability no greater than the personal data utilization probability guarantee; generating a pool that represents participants of the stochastic privacy program; stochastically selecting a plurality of members of the pool in accordance with the personal data utilization probability guarantees of the respective program participants represented by the pool; and utilizing the personal data of the program participants corresponding to the selected members of the pool.

In some embodiments, a computing system of a stochastic privacy provide includes: at least one processor; at least one storage device storing computer-executable instructions that, when executed on the one or more processors, causes the one or more processors to perform acts comprising: providing a personal data utilization probability guarantee, wherein a participant of a stochastic privacy program is guaranteed that personal data of the program participant will be utilized with a probability no greater than the personal data utilization probability guarantee; generating a pool that represents participants of the stochastic privacy program; stochastically selecting a plurality of members of the pool in accordance with the personal data utilization probability guarantees of the respective program participants represented by the pool; and utilizing the personal data of the program participants corresponding to the selected members of the pool.

In some embodiments, one or more computer-readable media store computer-executable instructions, the computer-executable instructions that, when executed on one or more processors, causes the one or more processors to perform acts including: providing a personal data utilization probability guarantee, wherein a participant of a stochastic privacy program is guaranteed that personal data of the program participant will be utilized with a probability no greater than the personal data utilization probability guarantee; generating a pool that represents participants of the stochastic privacy program; stochastically selecting a plurality of members of a pool, which represents participants of the stochastic privacy program, in accordance with the personal data utilization probability guarantees of the respective program participants represented by the pool; and utilizing the personal data of the program participants corresponding to the selected members of the pool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A new approach to privacy, which is referred to herein as stochastic privacy, is provided. Stochastic privacy centers on providing a guarantee to users (or program participants) about the likelihood that their data will be accessed and/or utilized. This measure may be referred to as the assessed or communicated privacy risk, which may be increased in return for increases in the quality of service or other incentives. Very small probabilities of sharing data may be tolerated by individuals (just as lightning strikes are tolerated as a rare event), yet can offer service providers sufficient information to optimize over a large population of users. Stochastic privacy harnesses inference and decision making to make choices about data collection within the constraints of a guaranteed privacy risk.

A user of a service provider may elect to become a participant in a stochastic privacy program implemented by a stochastic privacy provider. In some embodiments, the user may be incentivized to become a stochastic program participant.

As a stochastic program participant, the user may agree to the potential sharing of personal data and agree to a personal data utilization probability (i.e., a probability that the user's personal data will be utilized). In some embodiments, the user's personal data may be only potentially shared because the personal data may be under the user's control (e.g., stored in a device belonging to the user) unless the user is selected from a pool of participants, where the probability that the user is selected from the pool is no greater than the personal data utilization probability. In that case, the user's personal data may be obtained from the user's device.

However, in some embodiments, the user may agree, as a stochastic program participant, to sharing the personal data and agree to a personal data utilization probability. In such embodiments, some or all of the user's personal data may be stored in devices that are not under the user's control. For example, the user's personal data may be stored in a data store of a service provider and/or in a data store of the stochastic privacy provider. In addition, in such cases, the user's personal data are anonymized. The stochastic privacy provider may agree to utilize the user's personal data in accordance with the personal data utilization probability (i.e., the probability that the personal data is actually utilized will be no higher than the agreed upon personal data utilization probability).

The processes and systems described herein may be implemented in a number of ways. Example implementations are provided below with reference to the following figures.

Illustrative Environment

Figure 1:
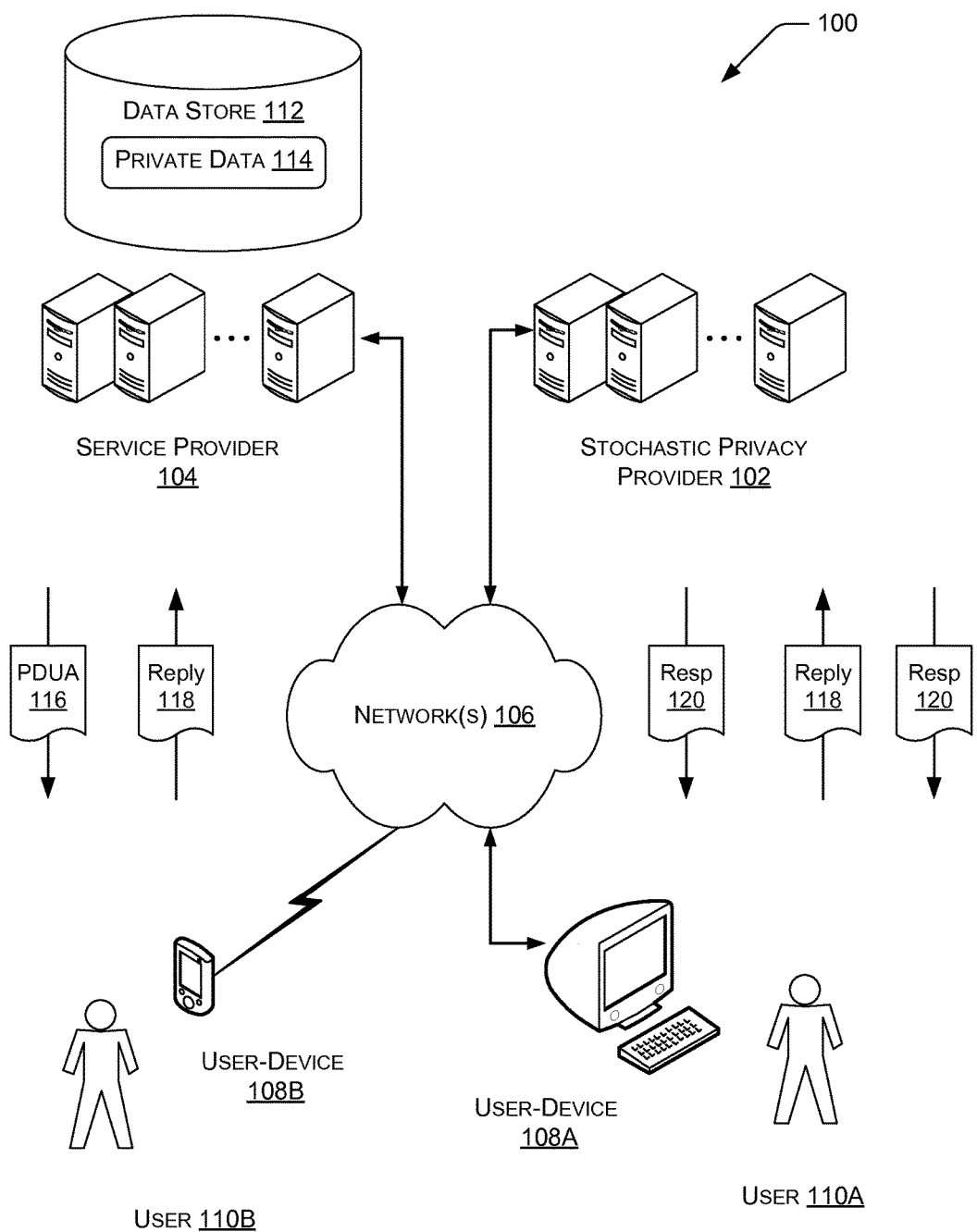
FIG. 1 is a schematic diagram of an illustrative environment in which stochastic privacy of personal data is provided.

FIG. 1 is a schematic diagram of an illustrative environment 100 in which stochastic privacy of personal data is provided. Personal data may include, among other things, names, contact information, contacts, personal identifiers (e.g., social security number, driver's license number), date of birth, content of documents, historical information (e.g., search history, web browsing history, communications history (e.g., with whom a user communicated, when, how, duration, etc.), location information, etc., and can include statistics and abstractions of such measures.

The environment 100 may include a stochastic privacy provider 102, one or more service provider 104, and network(s) 106. The network(s) 106 may include wired and/or wireless networks that enable communications between the various entities in the environment 100. In some embodiments, the network(s) 106 may include local area networks (LANs), wide area networks (WAN), mobile telephone networks (MTNs), and other types of networks, possibly used in conjunction with one another, to facilitate communication between the stochastic privacy provider 102 and the service provider 104.

The environment 100 may further include a plurality of user devices, which are collectively referenced as 108 and individually referenced as 108a and 108b, and a plurality of users, which are collectively referenced as 110 and individually referenced as 110a and 110b. The user devices 106 may be any device or computing device that includes connectivity to the network(s) 106. The user device 108a may be a computing device such as a server, desktop computer, laptop computer, netbook, gaming device, media player, etc., with which the user 110a may communicate with the stochastic privacy provider 102 and the service provider 104 via the network(s) 106. Similarly, the user device 108b may be a mobile device such as a mobile telephone, a smart phone, a tablet computer, a personal digital assistance (PDA), etc. with which the user 110b may communicate with the stochastic privacy provider 102 and the service provider 104 via the network(s) 106.

The users 110 may utilize services of the service provider 104. For example, the service provider 104 may be a search provider, or a content provider such as a video and/or audio content provider, a communications provider (e.g., e-mail provider, short message service (SMS) provider, audio-video communications provider), a social network provider, a content creation/editing provider, which may provide tools for editing/creating content such as text documents, etc.

Whatever the service provided by the service provider 104, the service provider 104 frequently desires to improve its services, create new services, and/or to gain a better understanding of the users 110. Accordingly, the service provider 104 may desire to obtain or generate models for predicting/understanding user behavior, likes, dislikes, usage of services etc. These models may be generated from machine learning of personal data of the users 110.

The service provider 104 may have one or data store(s) 112. The data store(s) 112 may include servers and other computing devices for storing and retrieving information. The data store(s) 112 may personal data 114 of the users 110.

The stochastic privacy provider 102 may negotiate with the users 110 over terms for allowing utilization of personal data of the users 110. For example, when a user 110 registers with the service provider 104, the registration of the user 110 may be provided to the stochastic privacy provider 102. The stochastic privacy provider 102 may provide the user 110 with a proposed personal data utilization agreement (PDUA) 116. The PDUA 116 may include terms by which the stochastic privacy provider 102 may abide to in exchange for an opportunity to utilize the personal data 108 of the user 110. PDUA 116 may include a personal-data-utilization probability ($P(n)=1/n$) (i.e., the probability that the personal data 108 will be utilized is no greater than the agreed upon personal-data-utilization probability ($P(n)=1/n$)) and may include an incentive or a reward to the user 110 in exchange for agreeing to the terms of the PDUA 116. The PDUA 116 may include a guarantee term which may indicate a period of time, a number of sessions, a number of interactions, etc. for which the PDUA 116 is effective. For example, the PDUA 116 may provide a guarantee that the user's personal data will be utilized is less than 1/1,000,000 per interaction, or per interaction, or per period of time (e.g., hour, day, week, etc.).

In some instances, the user 110 may decline or accept the terms of the PDUA 116 and send a reply 118 with the user's acceptance or rejection. In other instances, the user 110 may send a counter-offer in the reply 118. The counter-offer may include a different personal-data-utilization probability and/or may alter other terms of the PDUA 116.

If the reply 118 is a counter offer, the stochastic privacy provider 102 may provide a response 120. The response 120 may include a counter-counter-offer and/or acknowledgement of the user's acceptance or declination of the terms of the PDUA 116.

In some instances, there may be multiple series of reply 118 followed by response 120.

In some embodiments, if the user 110 has agreed to the PDUA 116 or a Response 120, the final response 120 may include a client-side tool (e.g., software, script, cookie, etc.) by which personal data of the user 110 may be stored on the user device 108. Such stored personal information may be provided to the stochastic privacy provider 102 in the event that the stochastic privacy provider 102 stochastically determines to utilize the personal data.

Illustrative Stochastic Privacy Provider

The stochastic privacy provider 102 may include one or more stochastic privacy provider servers 200 that include processors(s) 202 and memory 204. The memory 204 may store various modules, applications, programs, or other data. The memory 204 may include instructions that, when executed by the processor(s) 202, cause the processors 202 to perform the operations described herein for the stochastic privacy provider 102. In some embodiments, the memory 204 may store a stochastic privacy application 206. The stochastic privacy application 206 may include a number of modules that perform some or all of the various operations described herein. In accordance with various embodiments, the stochastic privacy application 206 may include some or all of the following modules: a user-analytic module 208, an optimizer module 210, and/or a system-analytic module 212. The memory 204 may also store a rewards generator application 214 and a model generator module 216.

The stochastic privacy provider servers 200 may have additional features or functionality. For example, the stochastic privacy provider servers 200 may also include additional data storage devices (removable and/or non-removable) such as, for example, magnetic disks, optical disks, or tape. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The memory 204 is an example of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the stochastic privacy provider servers 200. Any such computer storage media may be part of the stochastic privacy provider servers 200. Moreover, the computer-readable media may include computer-executable instructions that, when executed by the processor(s) 202, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The stochastic privacy provider servers 200 may also have input device(s) such as keyboard, mouse, pen, voice input device, touch input device, etc. Output device(s) such as a display, speakers, printer, etc. may also be included. These devices are well known in the art and are not discussed at length here.

The stochastic privacy provider servers 200 may also contain communication connections that allow the servers to communicate with other devices, such as over the networks 106.

The user analytic module 208 may interact with users 110 (e.g., during signup/registration) and establish an agreement between the user 110 and the service provider 104 on a personal data utilization probability guarantee. (The personal data utilization probability guarantee assures that the user's personal data will be utilized with a probability that is no greater than the personal data utilization probability guarantee.) The user 110 may be incentivized to agree to share the user's personal data in return for better quality of service, the potential for better quality of service in the future, and/or for rewards.

The system-analytic module 212 may provide user optimized service to the users 110. For example, the service provider 104 may be a web search provider, and in that case, the service provider 104 may desire to provide personalized search results and/or targeted advertising to the users 110.

The service provider 104 may record activities (e.g., search queries, browsing history, etc.) of stochastic privacy program participants and provide the recorded activities to the stochastic privacy provider server(s) 200 for inclusion in personal data to be processed by the stochastic privacy application 206.

The optimizer module 210 may make informed decisions about which personal data of users 110 (stochastic privacy program participants) to access or utilize. The optimizer module 210 may compute an expected value of information (VOI) of the personal data of a user 110, i.e., the marginal utility that the stochastic privacy application 206 may expect from recording activities of the user 110 or mining the user's personal data. The VOI may depend on user attributes such as demographics, geographic location, or service usage habits. In the absence of sufficient information about user attributes, the VOI may be small, and hence, there may be a need to learn the VOI from data.

In some embodiments, the optimizer module 210 may randomly select a set of stochastic privacy program participants from the population of stochastic privacy program participants for explorative sampling. Personal data of the selected stochastic privacy program participants may be provided to model generator module 216. The model generator module 216 may apply machine learning to the personal data to learn and improve the models of VOI computation.

As one non-limiting example of explorative sampling, to improve or optimize the service for users communicating in a specific language, the optimizer module 210 may choose to collect personal data from a subset of stochastic privacy program participants to learn how languages communicated by users 110 map to geography.

So as to abide by the terms of the agreed upon personal data utilization agreement (PDUA) 116, selective sampling procedures may couple obfuscation (e.g., anonymizing personal data) with VOI analysis to select the stochastic privacy program participants to provide personal data for utilization.

Let W be the population of users 110 signed up for a service with the service provider 104. Each user 110 $w \in W$ is represented with the tuple $\{r_w, c_w, o_w\}$, where $o_w$ includes ancillary information (e.g., metadata information such as IP addresses) about the user that is available prior to the user agreeing to become a stochastic program participant. $r_w$ is the privacy risk assessed by the user (i.e., it is the agreed upon probability for which the user's personal data may be utilized), and $c_w$ is the corresponding reward provided to the user 110. The optimizer module 210 may ensure that both the explorative and selective sampling respect the terms of the agreed upon personal data utilization agreement (PDUA) 116, i.e., the likelihood of sampling the personal data of any user w throughout the execution of stochastic privacy program must be less than the privacy risk factor $r_w$. The optimizer module 210 may track the sampling risk (likelihood of sampling) that user w faces during phases of execution of explorative sampling, denoted by $r_w^{ES}$, and selective sampling denoted by $r_w^{SS}$. The probability that the user's personal data is utilized is preserved so long as: $R_w - (1-(1-R_w^{ES}) \times (1-r_w^{SS})) \geq 0$.

The optimizer module 210 may implement selective sampling procedures that abide by terms of the PDUA 116 and that optimize the utility of the application in decisions about utilizing user data. Given a budget constraint B, the goal is to select user $S^M : S^M = \arg\max f(S)$ (equation 1) subject to $\Sigma_{s \in S} c_s \leq B$ and $r_w - r_w^M \geq 0 \, \forall w \in W$, where and f is non-negative, monotone (i.e., whenever $A \subseteq A' \subseteq W$, it holds that $f(A) \leq f(A')$) and submodular, and $r_w^M$ is the likelihood of selecting $w \in W$ by procedure M, and hence $r_w - r_w^M \geq 0$ captures the constraint of stochastic privacy guarantee for w.

In some embodiments, the rewards generator application 214 may generate the rewards offered to the user, and in some instances, the rewards generator application 214 may generate a range of rewards. The range of rewards may be based at least in part on a range of probabilities. For example, the rewards generator application 214 may generate a range of rewards corresponding to a range of probabilities for personal data utilization, where the higher the probability that the user 110 accepts for utilization of the user's personal data, the better the reward offed. In some embodiments, the rewards offered to the users 110 (stochastic privacy program participants) may be personalized based at least in part on general information or ancillary data about the user 110 (e.g., general location information may be inferred from a shared IP address).

In addition, the stochastic privacy provider servers 200 may include one or more data store 218 for storage of personal data 220, user profiles 222 and data utilization pool 224. The personal data 220 may include personal data of the users 110 that may be acquired from the user devices 108 and/or from the service provider 104. For example, in one embodiment, the service provider 104 may be a search provider, and the personal data 220 may include search histories of the users 110. The stochastic privacy provider 102 may acquire the search histories from the service provider 102. In some instances, the stochastic privacy provider 102 may acquire the search histories from the user devices 106. In such instances, the user devices 106 may include a cookie that records a history of searches. The search histories may be stored as personal data 220. As another non-limiting example, the service provider 104 may be a social network provider. In such instances, the personal data 220 may include, among other things, information posted in the social network. In some embodiments, the personal data 220 may be stored at the service provider 104 and/or at the client-device 108 until the stochastic privacy application 206 draws a user/program participant from the data utilization pool 224. In some embodiments, the personal data 220 may be anonymized personal data (i.e., personal data in which certain personal information (e.g., names, personal identifiers) have been removed. Anonymized personal data belonging to a user 110/program participant may be associated with a corresponding anonymized personal data identifier. It should be noted that in some embodiments, personal data 220 may be full or complete when stored in the data store 218, and may then be anonymized after selection for utilization.

The user-profiles 222 may include profile information for participants of a stochastic privacy program and may include a program participant identifier. A user-profile 222 may include identifying information for the corresponding user such as, but not limited to, name/username, contact information, social/economic information (e.g., where the user 110 generally lives, works, travels; profession of the user 110; income range of the user 110; hobbies/interest of the user 110; etc.), and other pertinent information. In addition, a user-profile 222 may include historical information for the corresponding user 110 such as, but not limited to, information indicative of whether the user 110 has previously entered into a stochastic privacy program, rewards/incentives offered and/or accepted for such participation, probabilities offered and/or accepted for such participation. Some of the information in the user-profile 222 may overlap with the personal data 220.

In some embodiments, when a user 110 registers with a service provider 104 and/or agrees (or declines) to participate in a stochastic privacy program, the user 110 provides information that may be included in the corresponding user-profile 222.

The data utilization pool 224 may include a plurality of program participant identifiers and/or a plurality of anonymized personal data identifiers. In some embodiments, program participant identifiers and/or anonymized personal data identifiers are weighted. For example, users 110a and 110b may have agreed to participate in the stochastic privacy program with probabilities that their respective personal data would be utilized of 1/10 and 1/100, respectively. In such a situation, users 110a and users 110b will have a number of program participant identifiers (or anonymized personal data identifiers) in the data utilization pool 224, however, there will be ten times as many program participant identifiers (or anonymized personal data identifiers) for user 110a in the data utilization pool 224 as there are for user 110b.

In some embodiments, when a program participant identifier is selected from the data utilization pool 224, the stochastic privacy application 206 may use the corresponding user profile 222 to identify the user 110 and then obtain the user's personal data from either or both of the client-device 106 associated with the user 110 and the service provider 104. In other embodiments, when a program participant identifier is selected from the data utilization pool 224, the stochastic privacy application 206 may obtain the corresponding personal data 220 from the data store 218.

In some embodiments, when an anonymized personal data identifier is selected from the data utilization pool 224, the stochastic privacy application 206 may retrieve the corresponding personal data 220 based on the anonymized personal data identifier.

In some embodiments, the stochastic privacy application may determine the personal data utilization probability guarantee for a user based at least in part on a contribution of multiple dependent or independent stochastic privacy trials to such a personal data utilization probability guarantee.

Figure 2:
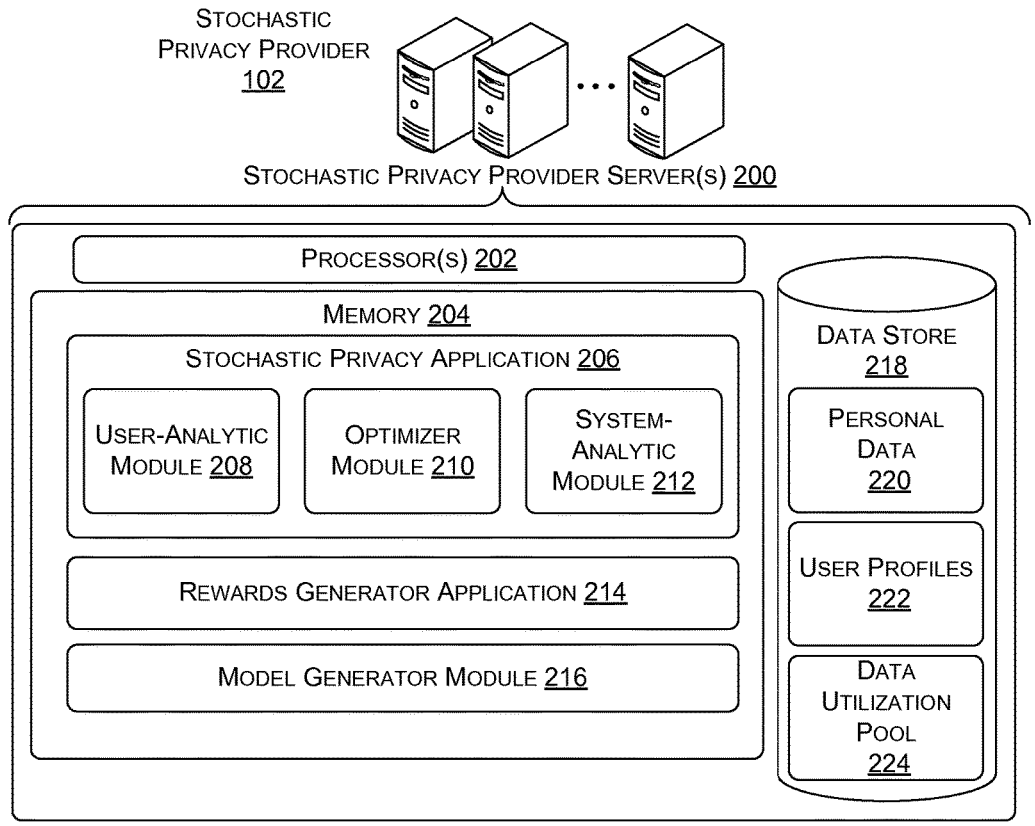
FIG. 2 is a schematic diagram of a stochastic privacy provider of FIG. 1.

Although the application and modules are shown under the stochastic privacy provider servers 200 in FIG. 2, the application and/or modules may be distributed across various servers and/or locations in some embodiments, such as being implemented in a cloud computing system.

Illustrative User-Device

Figure 3:
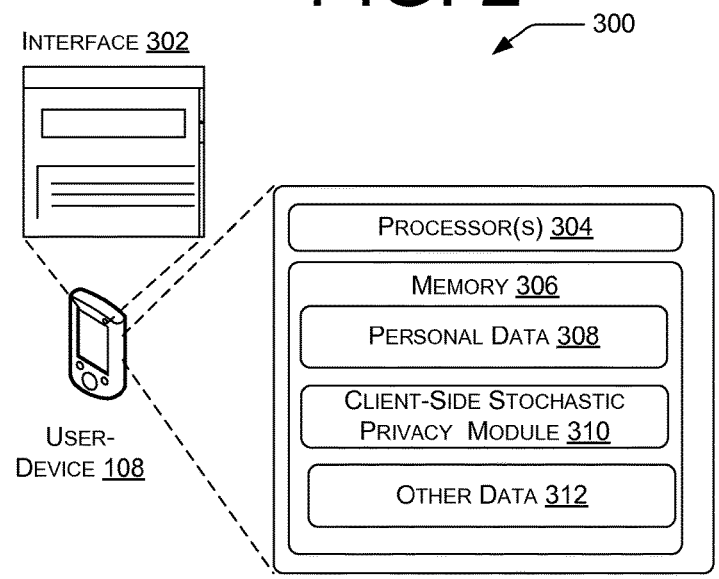
FIG. 3 is a schematic diagram of an illustrative computing architecture 300 of a user-device of FIG. 1.

FIG. 3 shows a block diagram of an illustrative computing architecture 300 of the user-device 108. The computing architecture 300 of the user-device 108 may include a user interface 302. The user interface 302 may include a touch sensitive display that may assist in output of the PDUA 116. The user 110 may interact with the stochastic privacy provider 102 via the user-device 108 by entering information using the user interface 302.

The computing architecture 300 of the user-device 108 may include processors(s) 304 and memory 306. The memory 306 may store various modules, applications, programs, or other data. The memory 306 may include instructions that, when executed by the processor(s) 304, cause the processors to perform the operations described herein for the user 110. In some embodiments, the memory 306 may store personal data 308, a client-side stochastic privacy module 310, and other data 312. The client-side stochastic privacy application 310 may be embodied in an application, a widget, script, cookie, etc. The other data 312 may include data and information from a variety of applications, for example, e-mail applications, communication applications, content editing/creating applications, playlists of media players, etc.

The computing architecture 300 may have additional features or functionality. For example, the computing architecture 300 may also include additional data storage devices (removable and/or non-removable) such as, for example, magnetic disks, optical disks, or tape. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The memory 304 is an example of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing architecture 300. Any such computer storage media may be part of the computing architecture 300. Moreover, the computer-readable media may include computer-executable instructions that, when executed by the processor(s) 302, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing architecture 300 may also have input device(s) such as keyboard, mouse, pen, voice input device, touch input device, etc. Output device(s) such as a display, speakers, printer, etc. may also be included. These devices are well known in the art and are not discussed at length here.

The computing architecture 300 may also contain communication connections that allow the user-devices 106 to communicate with other devices, such as over the networks 106.

The client-side stochastic privacy application 310 may record user activities (e.g., record web search histories, web browsing information) in personal data 308. In some embodiments, the client-side stochastic privacy application 310 may also obtain information from the other data 312 for inclusion in the personal data 308. For example, the client-side stochastic privacy application may record titles of content played by various media players (e.g., titles of songs), artists that performed the content, etc.

The client-side stochastic privacy module 310 may also facilitate a user in negotiating terms for a PDUA 116. The client-side stochastic privacy module 310 may receive user-input and provide the stochastic privacy provider 102 with the user-input via the reply 118. For example, the user 110 may decide to change the proposed probability that the user's personal data 308 may be utilized from $1/100$ to $1/1000$. In that case, the client-side stochastic privacy module 310 may receive the response 120 from the stochastic privacy provider 102 and provide the user 110 with another offer for participation in the stochastic privacy program via the user interface 302.

Illustrative User-Interface

Figure 4:
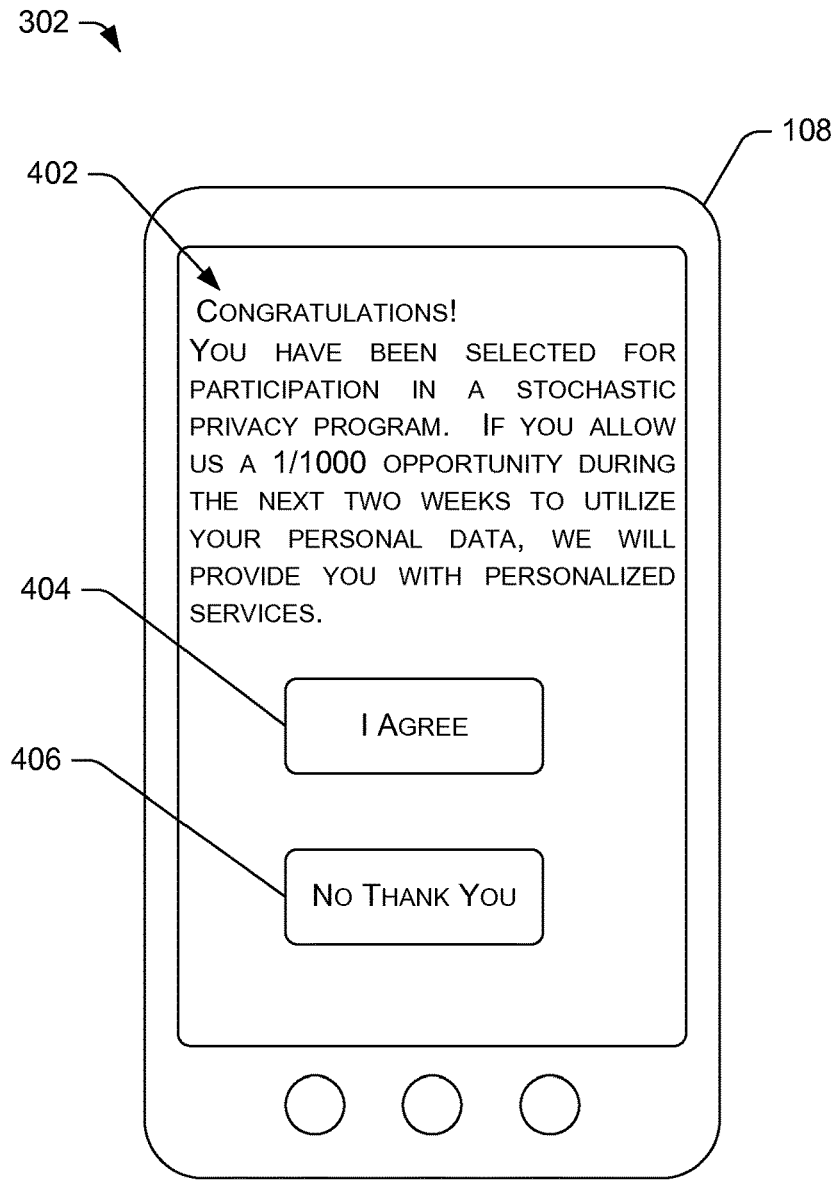
FIG. 4 is an illustrative user interface (UI) that displays a personal data utilization agreement.

FIG. 4 is an illustrative UI 302 that displays a PDUA 116 to the user 110. The UI 302 includes an offer 402 for participating in a stochastic privacy program offered by the stochastic privacy provider 102. The UI 302 may be displayed when the user 110 signs up/registers with the service provider 104. After the user 110 has signed up/registered with the service provider 104, the UI 302 may also be displayed when the service provider 104 updates its services, or after a random period of time, or on a periodic basis (e.g., every week, month, two months, etc.), or may be displayed after a current term of a PDUA 116 has expired. For example, the user 110 may agree to a PDUA 116 in which there is a $1/1000$ probability that the user's personal data 308 will be utilized in an agreed upon time period (e.g., ten (10) days), and at the end of the agreed upon time period, the user 110 may be provided for another PDUA 116.

The UI 302 also includes an acceptance command 404 to enable the user 104 to accept the offer from the stochastic privacy provider 102. By activating acceptance command 404, the user-device 106 generates and transmits the reply 118 accepting the offer, from the stochastic privacy provider 102.

The UI 302 also includes a declination command 406 to enable the user 104 to reject the offer from the stochastic privacy provider 102. By activating declination command 404, the user-device 106 generates and transmits the reply 118 rejecting the offer, from the stochastic privacy provider 102.

Figure 5:
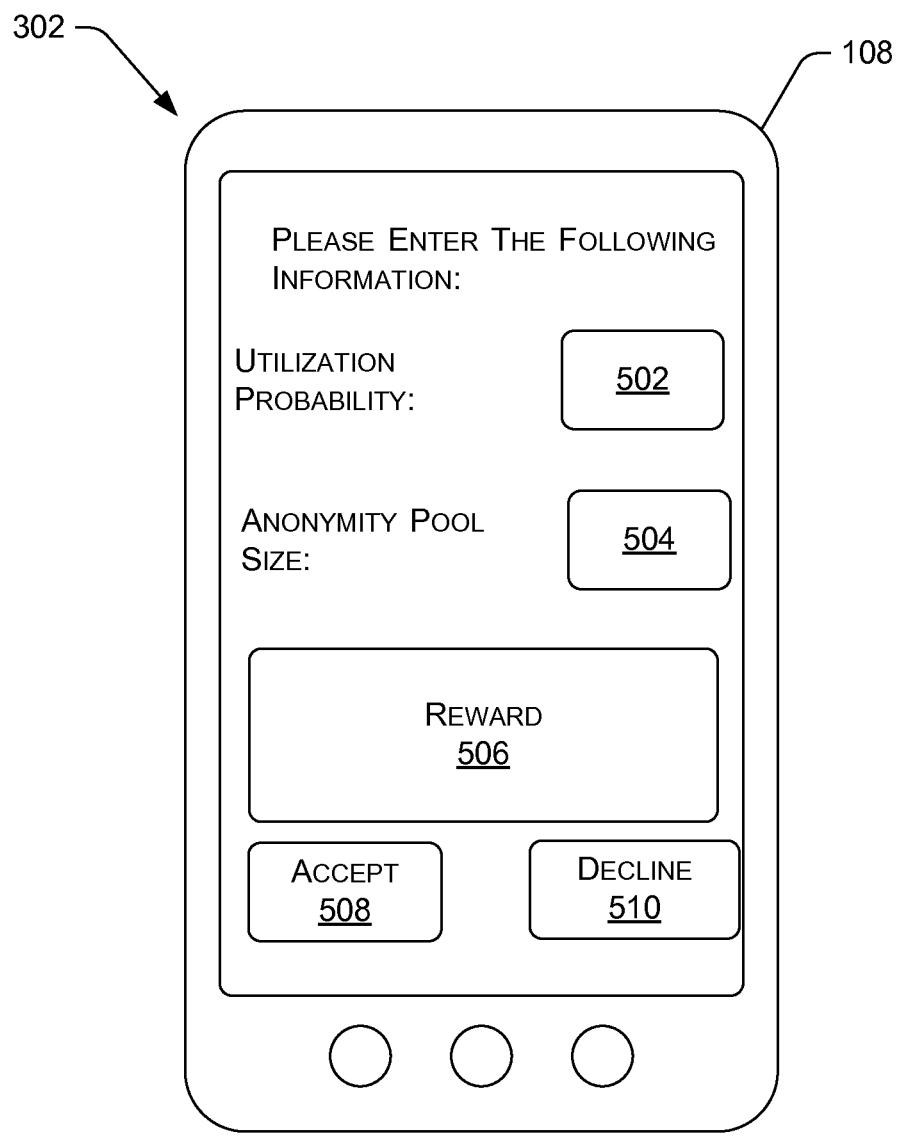
FIG. 5 is an illustrative user interface (UI) that displays another personal data utilization agreement.

FIG. 5 is an illustrative UI 302 that displays a PDUA 116 to the user 110. The UI 302 includes input windows 502 and 504, a reward window 506, an acceptance command 508, and a declination command 510. The user 110 may input various user selected values in the input windows 502 and 504. For example, the user 110 may enter a value for the probability that the user's personal data may be utilized by the stochastic privacy policy provider 102 into the input window 502 and may enter a value for the size of an anonymity pool in which the user's personal data may be placed. After the user 110 enters these values, or changes one of the values, a reward is displayed in the reward window 506. In this manner, the user 110 may adjust the risk that the personal data of the user will be utilized by the stochastic privacy provider 102 and determine whether the reward is acceptable in light of the risk. Once the user 110 has found an acceptable balance between the risk and the reward, the user may accept the terms and become a participant of the stochastic privacy program of the stochastic privacy provider 102 by activating the acceptance command 508. In the alternative, if the user 110 has not found an acceptable balance between the risk and the reward, the user may decline the offer to become a participant in the stochastic privacy program of the stochastic privacy provider 102 by activating the declination command 510.

Illustrative Techniques and Operation

The following provides a general discussion illustrative selection techniques and operations of the stochastic privacy provider 102. The selection techniques may be compared to a technique known as OPT, where OPT may find the optimal solution for equation 1, when the stochastic privacy constraint is removed. The following procedures may satisfy the following desirable properties: (1) provides competitive utility with respect to OPT with provable guarantees; (2) preserves stochastic privacy guarantees; and (3) runs in polynomial time.

Random Sampling: RANDOM

RANDOM technique samples the participants of the stochastic privacy program at random, without any consideration of cost and utility. The likelihood of any program participant w to be selected by the RANDOM technique is $r_w^{RANDOM}=B/W$ and hence privacy risk guarantees are satisfied since $B \leq W \times r$.

Greedy Selection: GREEDY

GREEDY technique is an iterative technique that maximizes the expected marginal utility at each iteration to guide decisions about selecting a next participant to log. The GREEDY technique may start with empty set $S=\emptyset$. At an iteration i, the GREEDY technique greedily selects a participant $s_i^* = \text{argmax}_{w \subseteq W \setminus S} (f(S \cup w) - f(S))$ and adds the participant to the current selection of participants $S = S \cup \{s_i^*\}$. The technique halts when $|S|=B$.

The utility obtained by this greedy selection technique is guaranteed to be at least $$\left(1-\frac{1}{e}\right)(=0.63)$$

times that obtained by OPT. However, such a greedy selection technique may violate the stochastic privacy constraints of equation 1.

Sampling and Greedy Selection: RANDGREEDY

The ideas behind RANDOM and GREEDY may be combined in a RANDGREEDY technique which provides guarantees on stochastic privacy and competitive utility. The RANDGREEDY technique is an iterative technique that samples a small number of program participants ψ(s) at each iteration, then greedily selects $s^* \in \psi(s)$ and removes the entire set ψ(s) from further consideration. By keeping the batch size $\psi(s) \leq W \times r/B$, the technique ensures that the privacy guarantees are satisfied.

In another embodiment of the RANDGREEDY technique, the participant user pool may be static, for simplicity, and this technique defers the greedy selection. This technique may be equivalent to first sampling the program participants from W at a rate r to create a subset $\tilde{W}$ such that $|\tilde{W}|=|W| \times r$, and then implementing the GREEDY technique of the subset $\tilde{W}$ to greedily select a set of program participants of size B.

The initial random sampling ensures a guarantee on the privacy risk for program participants during the execution of the technique. For any program participant $w \in W$, the likelihood of w being sampled and included in the subset $\tilde{W}$ is $r_w^{RANDGREEDY} \leq r$.

Greedy Selection with Obfuscation: SPGREEDY

A technique referred to as SPGREEDY may use an inverse approach of mixing the RANDOM technique and the GREEDY technique. In particular, the SPGREEDY technique may do greedy selection, followed by obfuscation. The SPGREEDY technique may assume an underlying distance metric $D: W \times W \to \mathbb{R}$ which captures the notion of distance or dissimilarity among program participants. The SPGREEDY technique operates in iterations and selects program participants s* with maximum marginal utility at each iteration. However, to ensure stochastic privacy, the SPGREEDY technique obfuscates (or anonymizes) the program participants s* with nearest 1/r number of program participants using the distance metric D to create a set ψ(s*). The SPGREEDY technique may then sample one program participant randomly from ψ(s*) and remove the entire set ψ(s*) from further consideration.

The guarantees on stochastic privacy risk hold in accordance with the following arguments: During the SPGREEDY technique, any program participant w becomes a possible candidate of being selected if the program participant is part of the set ψ(s*) in some iteration (e.g., iteration i). Given that $|\psi(s^*)| \geq 1/r$ and the SPGREEDY technique randomly samples $v \in \psi(s^*)$, the likelihood of w being selected in iteration i is at most r. The fact that the set ψ(s*) is removed from the available pool of program participants $\tilde{W}$ at the end of the iteration ensures that w can become a possible candidate for selection only once.

The following is exemplary pseudo code for implementing the SPGREEDY technique.

1. Input: users W; cardinality constraint B; privacy risk r; distance metric D: W × W → $\mathbb{R}$.
2. Initialize:
    a. Outputs: selected program participants S ← ∅;
    b. Variables: remaining program participants W' ← W;
3. Begin
4.     While |S| ≤ B do
5.         $s^*_i$ ← argmax$_{w \in W'}$ (f (S ∪ w) − f (S));
6.         Set ψ(s*) ← s*;
7.         While |ψ(s*)| < 1/r do
8.             v ← argmin$_{w \in W' \setminus \psi(s^*)}$ D (w, s*);
9.             ψ(s*) ← ψ(s*) ∪ {v};
10.        Randomly select $\vec{s} \in \psi(s^*)$;
11.        S ← S ∪ {$\vec{s}$};
12.        W' ← W' \ ψ(s*);
13. Output: S FIGS. 6-9 are flow diagrams of an illustrative processes 600-900. The process 600-800 are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, including processes described hereinafter, shall be interpreted accordingly.

Figure 6:
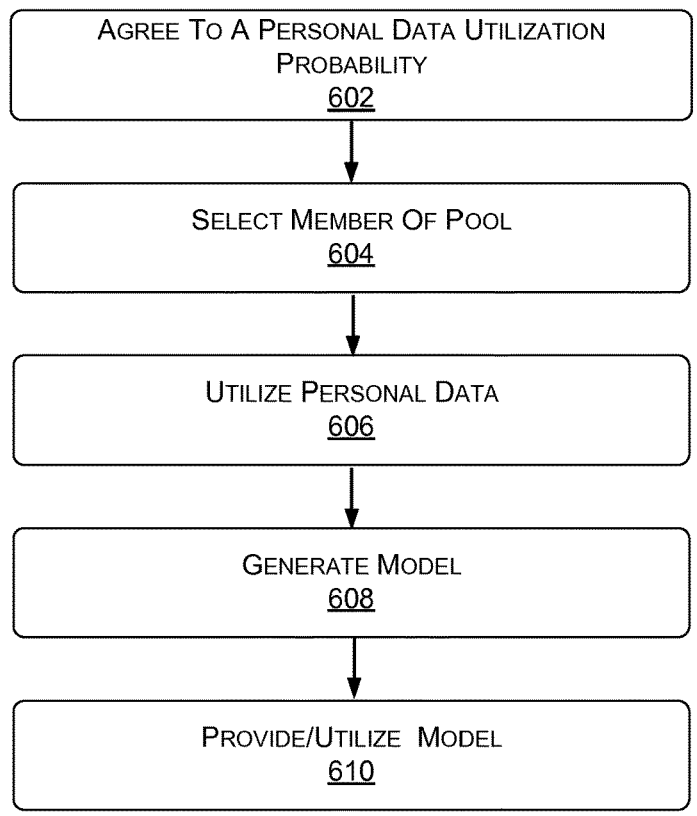
FIG. 6 is a flow diagram of an illustrative process to improve a service or product.

FIG. 6 is a process 600 for improving a service or product.

At 602, a program participant of a stochastic privacy program agrees to a probability that the participant's personal data may be utilized.

At 604, a member of a pool is selected. The pool may be a pool of program participant identifiers and/or anonymized personal data identifiers. The pool is constructed in accordance with utilization probabilities agreed to by the program participants and the stochastic privacy provider 102.

At 606, personal data corresponding to selected members of the pool is utilized. In some instances, the personal data may be utilized to generate/learn a model. In other instances, the personal data may be utilized to determine a subset of program participants, in which case, the process may return to 604. Otherwise, the process continues to 606.

At 608, a model is learned/generated from the personal data.

At 610, the model may be provided to the service provider, and the service provider may utilize the model for providing improved services or products.

Figure 7:
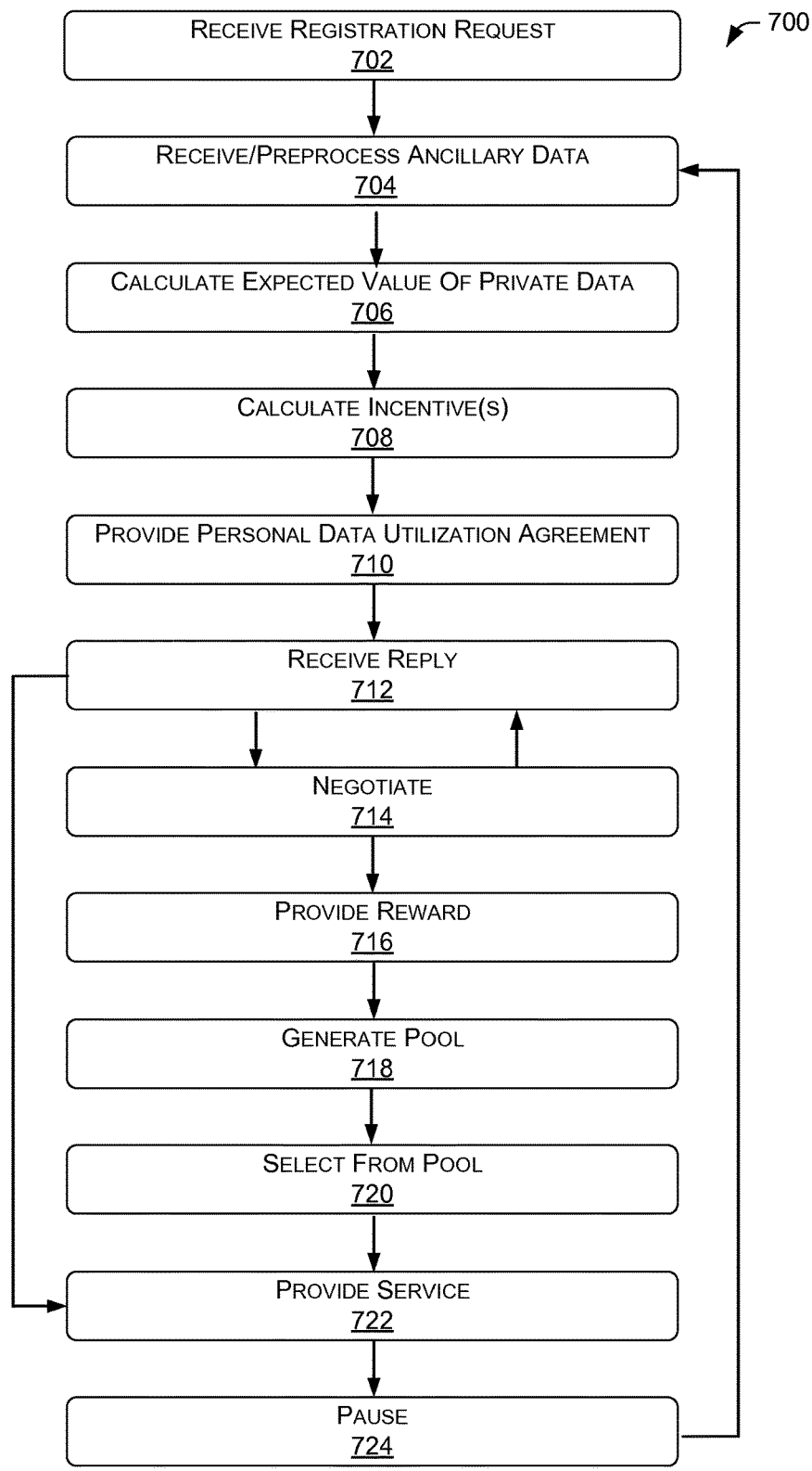
FIG. 7 is a flow diagram of an illustrative process to register users into a stochastic privacy program.

FIG. 7 is a process 700 for registering users 110 into a stochastic privacy program.

At 702, the stochastic privacy provider 102 may receive a registration request for registering a user 110 with the service provider 104. The registration request may come from the user 110 and/or from the service provider 104.

At 704, the stochastic privacy provider 102 may receive and/or process ancillary data associated with the user 110. The ancillary data may include information from which pertinent attributes of the user 110 may be inferred. For example, a generalized location of the user 110 may be inferred from the IP address of the user-device 108. In some instances, the ancillary data may include information that the user 110 provides during the registration process. In some instances, ancillary data may include historical information about whether the user 110 has previously been a stochastic privacy program participants and what incentives were offered.

At 706, the stochastic privacy provider calculates an expected value of the personal data of the user 110. The expected value of the personal data may be based at least in part on the ancillary data. To the service provider 104, the personal data of some users may be of more importance than the personal data of other users. For example, the personal data of affluent user might be more important than the personal data of a less affluent user. As another example, the personal data of a user belonging to a social/economic group that is underrepresented in various models may be more important than that of users belonging to social/economic groups that are overrepresented in various models. As yet another example, the personal data of a user 110, where the user 110 has a history of declining participation in stochastic privacy programs (or other programs where the personal data is shared), may be more important than that of users who readily agree to sharing their personal data.

At 708, the stochastic privacy provider 102 may calculate an incentive or range of incentives to incentivize the user 110 into becoming a stochastic privacy program participant. The range of incentives may be correlated to various risks (probabilities) that the user 110 is willing to agree to with regard to the user's personal data being utilized.

At 710, the stochastic privacy provider 102 may provide the user 110 with a personal data utilization agreement (PDUA) 116. The PDUA 116 may include the terms by which the user 110 may agree to participate in the stochastic privacy program participant. For example, the PDUA 116 may include a termination date, a guarantee that the personal data will be utilized no more than a set number of times (e.g., once), a guarantee that the probability that the user/personal data will be selected from a pool of program participants will not be greater than an agreed upon probability, and may include an incentive or range of incentives.

At 712, the stochastic privacy provider 102 may receive a reply 118 from the user 110. The reply may include an indicator of whether the user 110 has agreed to become a program participant, declined to become a program participant, or has provided a counter offer (e.g., changed a term of the PDUA 116). If the user 110 declined, the process continues at 722. If the user accepted, the process continues at 716. Otherwise, the process continues at 714.

At 714, the stochastic privacy provider 102 negotiates terms of program participation with the user 110 and provides the user 110 with a response 120. The process returns to 712.

The negotiations may be conducted through a series of replies 118 and responses 120. In the negotiations, the stochastic privacy provider 102 may provide a range of incentives to the user 110.

At 716, the user 110 may be provided with a reward for program participation.

At 718, the stochastic privacy provider 102 may generate a pool. The pool may be a pool of program participant identifiers and/or a pool of anonymized personal data identifiers.

At 720, the stochastic privacy provider 102 may stochastically select from the pool. In some embodiments, the selection may be based at least in part on a RANDOM technique, GREEDY technique, a RANDYGREEDY technique, a SPGreedy technique, or a combination of the above techniques.

At 722, the service provider 104 provides the service for which the user 110 registered.

At 724, the stochastic privacy provider 102 waits before approaching users 110 about becoming program participants, and then the process continues at 706. The stochastic privacy provider 102 may wait until the current term of a current PDUA 116 for a current program participant has expired and then approach the program participant about renewing program participation. In some embodiments, the stochastic privacy provider 102 may wait a random period of time before approaching the users 110 about becoming program participants. In other embodiments, the stochastic privacy provider 102 may wait a set period of time before approaching the users 110 about becoming program participants.

Figure 8:
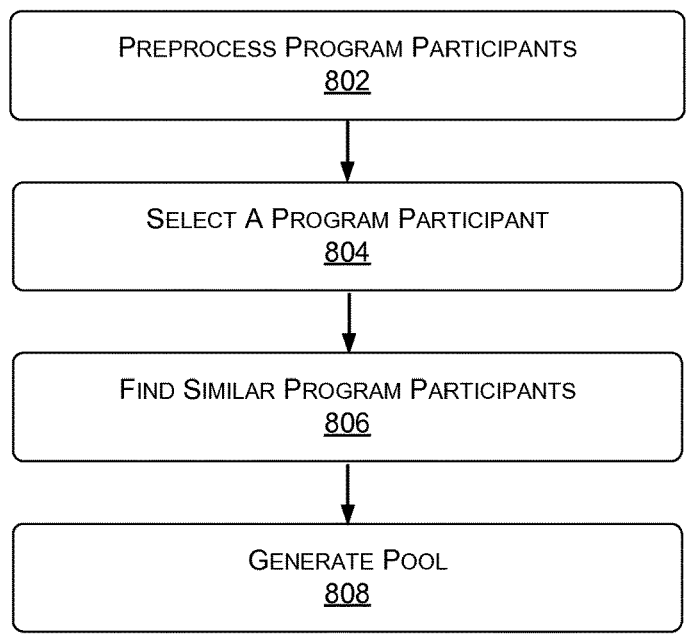
FIG. 8 is a flow diagram of an illustrative process to pool anonymized personal data.

FIG. 8 is a process 800 for pooling anonymized personal data.

At 802, participants of a stochastic privacy program are preprocessed. The preprocessing may involve analysis of participant profile information and/or analysis of ancillary data. In some instances, the program participants may be ranked or sorted according to various criteria and distance metrics may be applied.

At 804, a first program participant is selected. The program participant may be selected based at least in part on attributes of the program participant.

At 806, a set of program participants are selected. The set of program participants may be selected based at least in part on their similarity to the first program participant. For example, the set of program participants may be within a cutoff distance of a distance metric from the first program participant.

At 808, a pool may be generated. The pool may be comprised of a subset of the set of program participants. The members of the pool may be represented in accordance with agreed upon probabilities.

Figure 9:
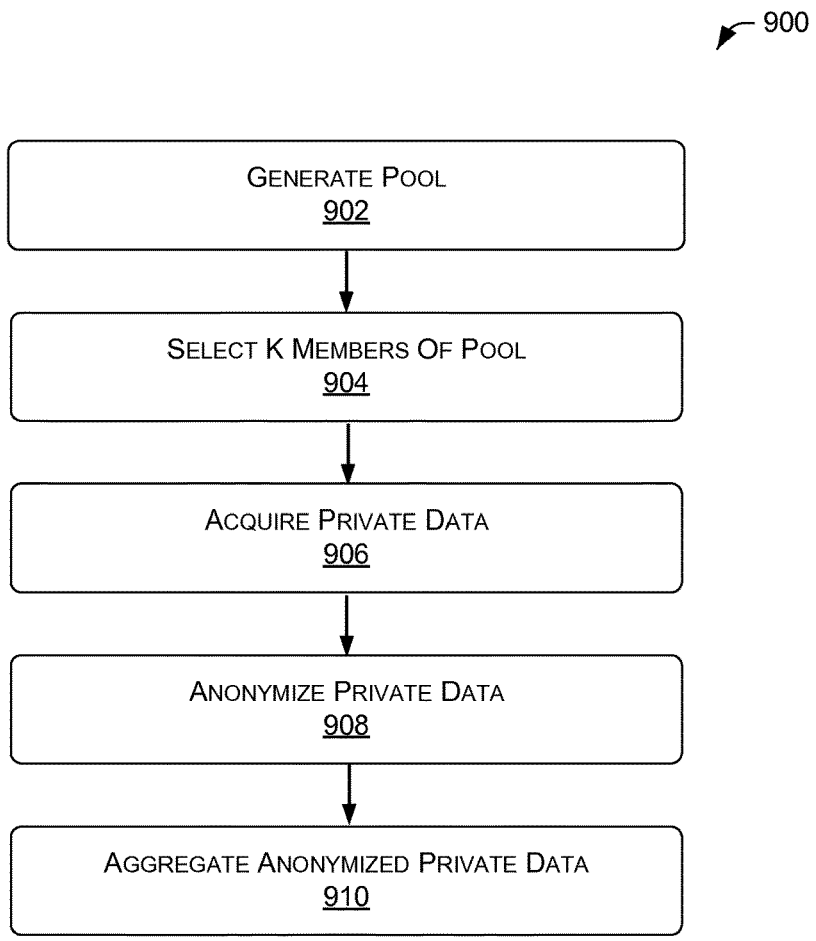
FIG. 9 is a flow diagram of an illustrative process to anonymize personal data.

FIG. 9 is a process 900 for anonymizing personal data.

At 902, a pool may be generated. The members of the pool may be represented in accordance with agreed upon probabilities.

At 904, a number (K) of members of the pool may be selected.

At 906, personal data of the selected members of the pool may be acquired. In some embodiments, personal data of all of the members of the pool may be acquired. In other embodiments, personal data belonging to only the selected members of the pool is acquired.

At 908, the acquired personal data is anonymized.

At 910, the anonymized personal data of the selected members of the pool may be aggregated.

In some embodiments, the size of the pool (K) may be mutually agreed upon by the program participants and the stochastic privacy provider 102. The stochastic privacy provider 102 may guarantee that the size of the pool (K) shall be greater than a pool-size threshold (M) before the anonymized personal data is utilized. In some instances, program participants may be more willing to have a lower personal data utilization probability guarantee for a larger pool-size threshold.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method to produce a user behavior model for a service provider, the method comprising:
   generating a pool of program participants from participants in a stochastic privacy program based on a personal data utilization probability guarantee associated with each participant, the personal data utilization probability guarantee defining a probability that personal data will be used in the stochastic privacy program;
   for each program participant in the pool, calculating a measure of marginal utility of using the personal data associated with the program participant based at least in part on the personal data utilization probability guarantee and one or more attributes associated with the program participant;
   based on the calculated marginal utilities, selecting a subset of program participants from the pool based on an iterative process that samples, at each iteration, a given number of program participants $\varphi(s)$, greedily selects $s^* \in \varphi(s)$, and removes the entire given number of program participants $\varphi(s)$ from consideration in subsequent iterations;
   generating the user behavior model by machine learning the user behavior model using the personal data associated with the subset of program participants; and
   providing the user behavior model to the service provider.

2. The method of claim 1, further comprising prior to selecting the subset of program participants, anonymizing the personal data associated with the subset of program participants.

3. The method of 2, further comprising:
   aggregating the anonymized personal data of a number (n) of program participants in the subset of program participants; and
   determining whether the number n is greater than or equal to a threshold number m, wherein the aggregated anonymized personal data is only used to generate the user behavior model when the number n is greater than or equal to the threshold number m.

4. The method of 1, further comprising calculating a range of rewards for participation in the stochastic privacy program, each reward corresponding to a range of personal data utilization probability guarantees.

5. The method of claim 1, wherein:
   the pool comprises a plurality of program participants that represent a subset of all program participants in the stochastic privacy program; and
   the operation of generating the pool comprises:
      selecting a first member from all program participants in the stochastic privacy program, the first member representing a specific program participant;
      determining at least one attribute associated with the specific program participant;
      selecting a number (N) of program participants from all program participants that have at least one attribute similar to the at least one attribute associated with the specific program participant; and
      generating the pool using the specific program participant and the selected number (N) of program participants.

6. The method of claim 1, further comprising prior to generating the pool of program participants, receiving, from each program participant, an agreement to participate in the stochastic privacy program.

7. The method of claim 1, further comprising prior to calculating the measure of marginal utility, receiving, from the service provider, the personal data associated with the program participants in the pool.

8. The method of claim 1, wherein the service provider comprises one of an internet search provider, an internet business, or a social network.

9. A method to produce a user behavior model for a service provider, the method comprising:
   receiving, from a plurality of service provider users, an agreement to participate as a program participant in a stochastic privacy program;
   receiving a user-selected personal data utilization probability guarantee from each program participant that defines a probability that personal data associated with the program participant will be used;
   receiving, from the service provider, the personal data associated with the program participants;
   for each program participant, calculating a measure of marginal utility r of using the personal data associated with the program participant based at least in part on the personal data utilization probability guarantee and one or more attributes associated with the program participant;
   selecting a pool of members from the program participants of the stochastic privacy program based at least in part on an iterative process comprising, at each iteration:
      selecting a given number of program participants s with maximum marginal utility;
      generating a set of members $\varphi(s)$ by obfuscating the given number of program participants s that are nearest 1/r number of program participants based on dissimilarities between program participants;
      sampling one member randomly from $\varphi(s)$; and
      removing the set of members $\varphi(s)$ from consideration in subsequent iterations;
   generating the user behavior model by machine learning the user behavior model using the personal data associated with the members in the pool of members; and
   providing the user behavior model to the service provider, the user behavior model enabling the service provider to enhance one or more services.

10. The method of claim 9, wherein the dissimilarities are defined by a distance metric D comprising D: $W \times W \to \mathbb{R}$, where W represents a population of users of the service provider.

11. The method of claim 9, wherein the service provider comprises one of an internet search provider, an internet business, or a social network.

12. The method of claim 9, further comprising:
prior to selecting the pool of members, anonymizing the personal data associated with the members in the pool of members;
aggregating the anonymized personal data of a number (n) of members in the pool of members; and
determining whether the number n is greater than or equal to a threshold number m, wherein the aggregated anonymized personal data is only used to generate the user behavior model when the number n is greater than or equal to the threshold number m.

13. The method of claim 9, further comprising calculating a range of rewards for participation in the stochastic privacy program, wherein each reward corresponds to a range of personal data utilization probability guarantees.

* * * * *